United States Patent [19]

Kato et al.

[11] Patent Number: 5,365,517
[45] Date of Patent: Nov. 15, 1994

[54] ISDN TERMINAL EQUIPMENT

[75] Inventors: Tamiko Kato, Atsugi; Shinichiro Ozeki, Isehara; Takanori Fujii, Sagamihara, all of Japan

[73] Assignee: Ricoh Company, Ltd., Tokyo, Japan

[21] Appl. No.: 115,547

[22] Filed: Sep. 3, 1993

[30] Foreign Application Priority Data

Sep. 4, 1992 [JP] Japan .................................. 4-236245

[51] Int. Cl.⁵ .......................... H04J 3/12; H04M 3/22
[52] U.S. Cl. ............................... 370/58.3; 370/110.1; 379/165
[58] Field of Search ................... 370/58.1, 58.2, 58.3, 370/85.6, 110.1; 379/93, 157, 161, 165, 208, 209; 358/425

[56] References Cited

U.S. PATENT DOCUMENTS

| 4,970,723 | 11/1990 | Lin | 370/110.1 |
| 5,142,525 | 8/1992 | Nakatsuma | 370/79 X |
| 5,305,318 | 4/1994 | Ozeki et al. | 370/110.1 X |

*Primary Examiner*—Melvin Marcelo
*Attorney, Agent, or Firm*—Oblon, Spivak, McClelland, Maier & Neustadt

[57] ABSTRACT

ISDN (Integrated Services Digital Network) terminal equipment connected to an ISDN basic rate interface and capable of enhancing efficient communication. The terminal equipment reoriginates a call as soon as an idle channel occurs. This reduces the waiting time up to call reorigination and enhances efficient communication.

5 Claims, 5 Drawing Sheets

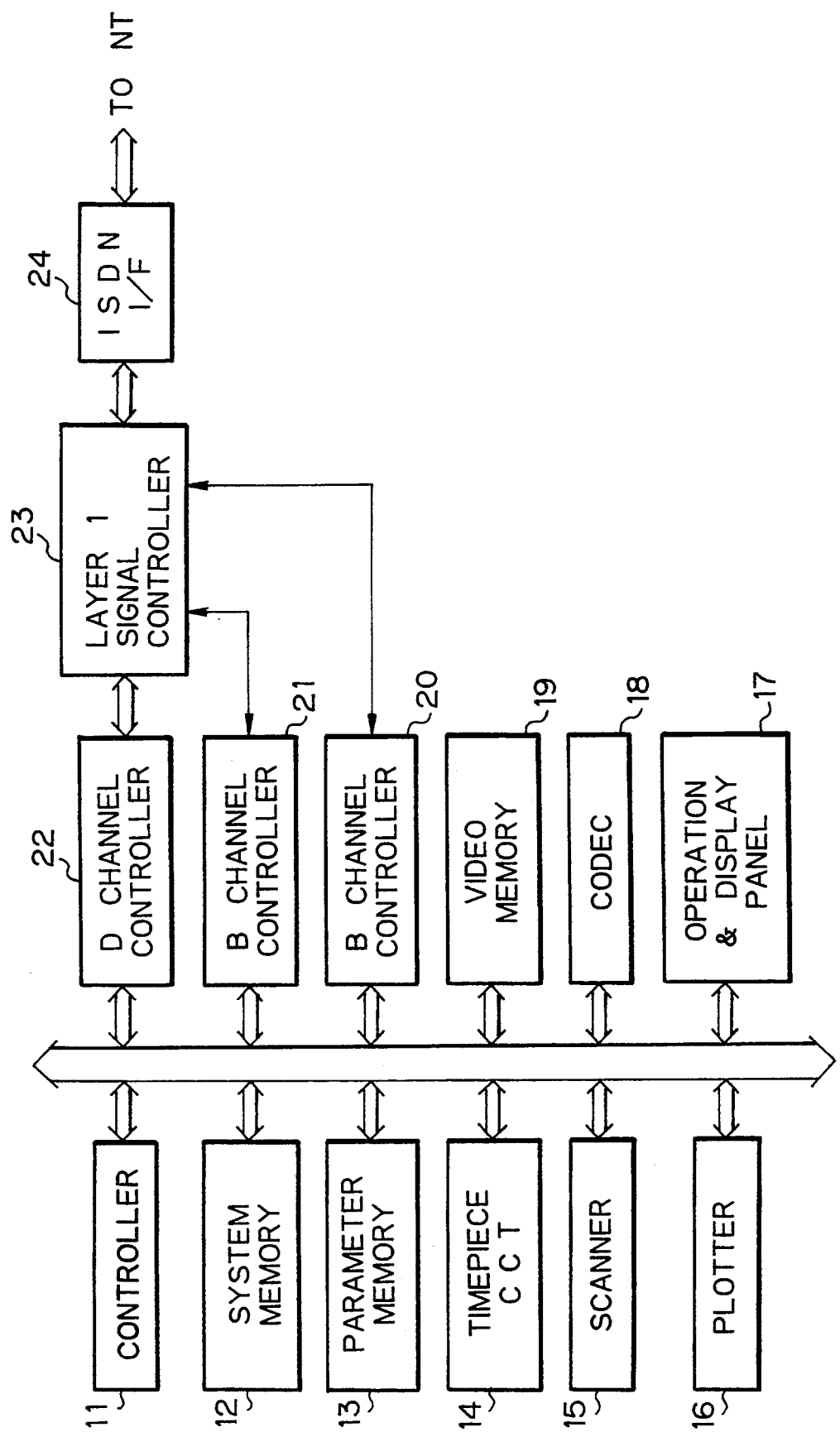

ISDN TERMINAL EQUIPMENT

BACKGROUND OF THE INVENTION

The present invention relates to ISDN (Integrated Services Digital Network) terminal equipment connected to an ISDN basic rate interface and, more particularly, ISDN terminal equipment capable of enhancing efficient communication.

ISDN terminal equipment for use with an ISDN is extensively used today and connected to an ISDN basic rate interface. The basic rate interface is assigned to independent subscriber lines which are accommodated in an existing telephone network and implemented by metallic subscriber lines. The basic rate interface is provided with two B channels for user data transfer and having a transmission rate of 64 kilobits per second (kb/s), and one D channel for signaling and data transfer and having a transmission speed of 16 kb/s. Regarding private wiring, the basic rate interface has a bus configuration selectively implementing 1:1 connection or 1:n connection, allowing a plurality of ISDN terminal equipment to share a single bus.

Assume that when one of a plurality of ISDN terminal equipment connected to a single bus originates a call, another ISDN terminal has already occupied the two B channels. Then, the basic rate interface returns a message representative of a no idle channel condition, i.e., a channel release message REL or a release complete message REL COMP to the calling terminal. In this condition, it has been customary for the terminal equipment to originate a call again on the elapse of a predetermined period of time by use of, e.g., a timer. However, determining the waiting time uniformly by a timer, i.e., neglecting the actual communication obstructs efficient communication.

Moreover, for the ISDN terminal equipment using the two B channels, once the B channels are occupied, they are continuously occupied until the end of communication, despite that a single B channel suffices the communication. This prevents the other terminal equipment connected to the same bus in a multipoint configuration from originating a call, thereby obstructing smooth communication. In addition, when the ISDN terminal equipment occupying the B channels receives a setup request SETUP from another terminal equipment sharing the same bus, it cannot respond to the request and causes the calling terminal to wait until the communication ends.

SUMMARY OF THE INVENTION

It is, therefore, an object of the present invention to provide ISDN terminal equipment which reduces the waiting time up to the reorigination of a call by reoriginating a call as soon as an idle channel occurs, thereby enhancing efficient communication.

It is another object of the present invention to provide ISDN terminal equipment which, when detecting a no idle channel signal while occupying two B channels, releases one of the B channels so as to allow another terminal equipment to use it, thereby promoting efficient communication.

It is another object of the present invention to provide ISDN terminal equipment which, when another terminal equipment using the released B channel ends the communication thereof, again sets up a call on the resulting idle B channel, thereby recovering the communication using the two B channels.

It is another object of the present invention to provide ISDN terminal equipment which on receiving a SETUP indicative of a no idle channel condition, releases one of the two B channels and allocates it to terminal equipment originating the SETUP, through the ISDN thereby promoting efficient communication.

It is another object of the present invention to provide ISDN terminal equipment which releases one of the two B channels in response only to a SETUP from terminal equipment whose transmission identification (ID) is coincident and, therefore, returns a response only to a particular party.

It is another object of the present invention to provide ISDN terminal equipment which releases one of the two B channels in response only to a SETUP from terminal equipment transmitted over the ISDN whose subaddress is coincident and, therefore, returns a response only to a particular party.

In accordance with the present invention, ISDN terminal equipment connected in a multipoint configuration to an ISDN basic rate interface having two B channels for user data transfer and a single D channel for signaling and data transfer as channels which a single terminal equipment can use sets up a call on condition that the two B channels are idle. The terminal equipment comprises an idle channel detecting circuit for determining, when the terminal equipment receives a response indicative of a no idle channel condition from the basic rate interface at the time of call origination, whether or not channels having been occupied by another terminal equipment are released, and a reoriginating circuit for reoriginating a call when the idle channel detecting circuit detects idle channels.

Also, in accordance with the present invention, ISDN terminal equipment connected in a multipoint configuration to an ISDN basic rate interface having two B channels for user information transfer and a single D channel for signaling and data transfer as channels which a single terminal equipment can use is capable of holding a communication over only one of the two B channels. The terminal equipment comprises a no channel detecting circuit for detecting, when the terminal equipment is using the two B channels, a signal indicative of a no idle channel condition and sent from an ISDN to another terminal equipment, and a channel releasing circuit for releasing, when the no channel detecting circuit detects the signal, one of the two B channels having been used by the terminal equipment.

Further, in accordance with the present invention, ISDN terminal equipment connected in a multipoint configuration to an ISDN basic rate interface having two B channels for user information transfer and a single D channel for signaling and data transfer as channels which a single terminal equipment can use is capable of holding a communication over only one of the two B channels. The terminal equipment comprises a SETUP detecting circuit for detecting, when the terminal equipment transmitted over the ISDN is using the two B channels, a message SETUP terminated at the terminal equipment from another terminal equipment, and a channel releasing circuit for releasing, when the SETUP detecting circuit detects the message SETUP, one of the two B channels having been used by the terminal equipment.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing ISDN terminal equipment with which various embodiments of the present invention are practicable and implemented as a facsimile apparatus;

DESCRIPTION OF THE PREFERRED EMBODIMENTS

Figure 2A:
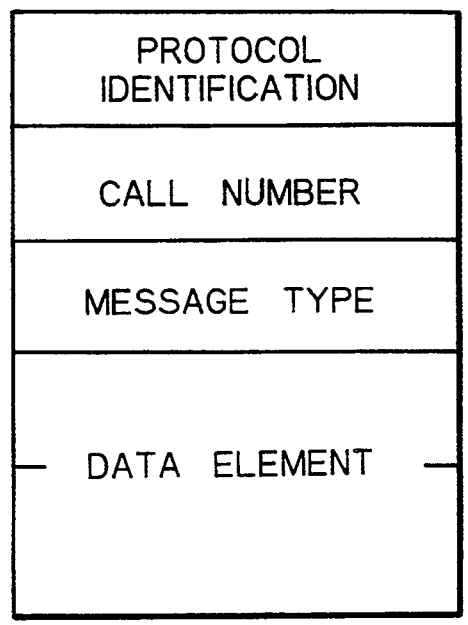
FIG. 2A shows the format of a message SETUP for setting up a call.

Referring to FIG. 1 of the drawings, ISDN terminal equipment embodying the present invention is shown and implemented as a facsimile apparatus by way of example. As shown, the the equipment has a controller 11 for controlling various sections of the equipment and executing, e.g., the CCITT Group IV facsimile function of higher layers. A system memory 12 stores various kinds of data necessary for the controller 11 to execute a control program and a processing program, while serving as a work area. A parameter memory 13 stores various kinds of data, i.e., parameters particular to the apparatus. A timepiece circuit 14 provides current time. A scanner 15 scans a document at a predetermined resolution. A plotter 16 records an image in a recording medium at a predetermined resolution.

An operation and display panel 17 is accessible for manipulating the equipment and provided with various keys and indicators. A coder/decoder (CODEC) 18 codes a video signal by compression or decodes coded video data to reproduce an original video signal. A video memory 19 is capable of storing a number of video data coded by compression. B channel controllers 20 and 21 execute, among Group VI facsimile transmission control procedures using B channels (data channels), the transmission control procedure of layers 2, 3, 4 and 5. A D channel transmission controller 22 assigned to control over communication with an ISDN on a D channel (signaling channel), e.g., call control. A layer 1 signal controller 23 has a signal processing function meant for the ISDN layer 1, a function of combining and separating a D channel signal and two B channel signals, and a layer 1 signal control function associated with an ISDN basic rate interface or net terminating device (NT). An ISDN I/F (interface) connects the terminal equipment physically to the ISDN. The sections described above are connected to a system bus and interchange data mainly over the system bus.

FIG. 2A shows a message format particular to ISDN call setup. As shown, the format includes a "protocol identification" for identifying protocol specifications which define a layer 3 call control message. A "call number" indicates a particular call with which the message is associated. A "message type" identifies the content of the message. "Data elements" are classified into essential elements which the message has to include without exception, and optional elements which are included when needed.

Figure 2B:
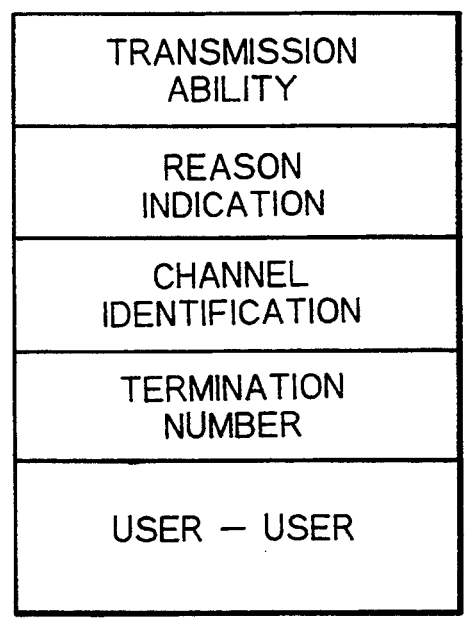
FIG. 2B shows the contents of data elements included in the format of FIG. 2A.

As shown in FIG. 2B, the data elements include a "transmission ability" consisting of the content of data to transmit, an exchange function to use, a data transfer speed, data indicative of a data transfer mode, and data indicative of the protocol of user data. A "reason indication" includes a source of generation and a reason indication value. A "channel identification" distinguishes a B1 channel and a B2 channel from each other. A "termination number" is representative of the ISDN address of terminal equipment to receive data. "User-user" implements data transmission between users; the content of this data is transmitted transparently to the destination without being interpreted by the network.

Figure 3:
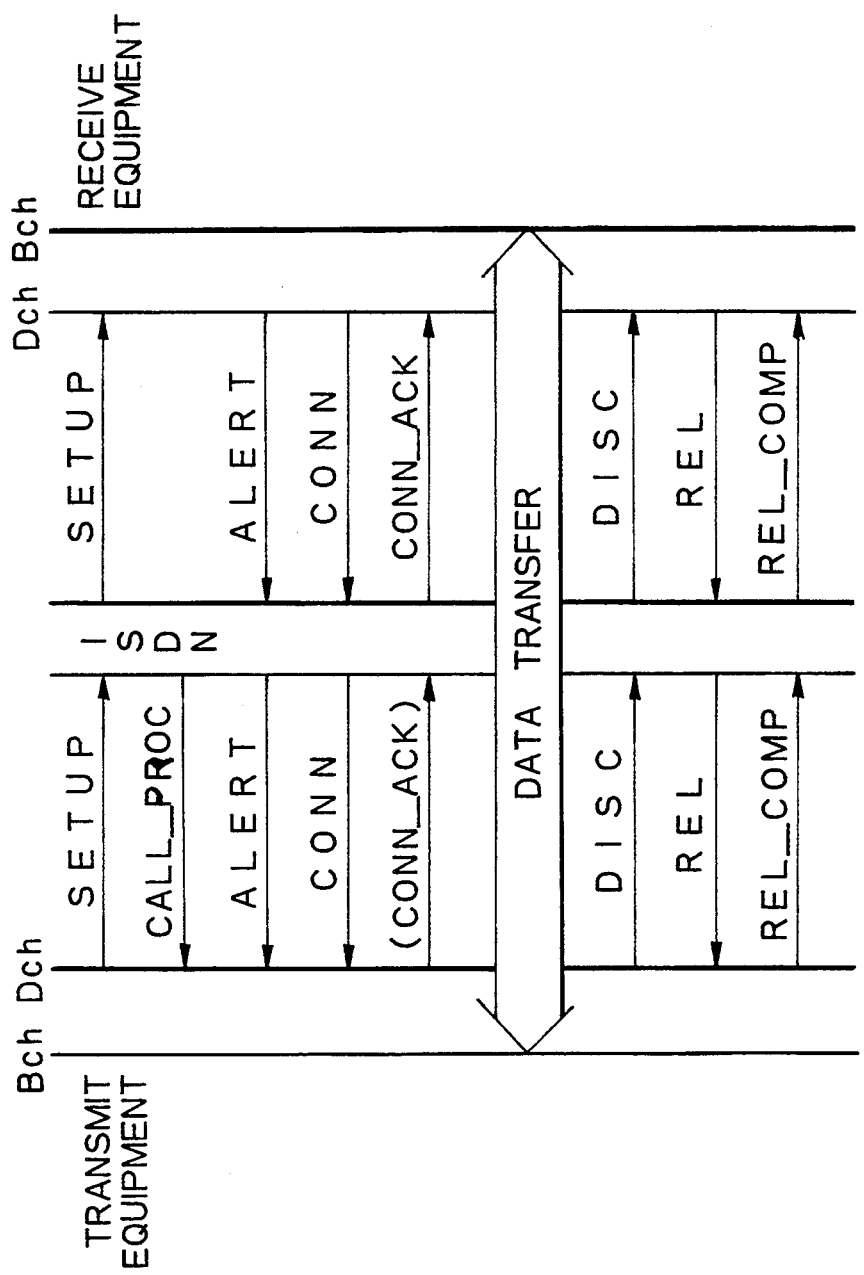
FIG. 3 shows a basic transmission procedure which the ISDN terminal executes at the time of communication by using the message SETUP of FIGS. 2A and 2B.

FIG. 3 shows a basic transmission procedure which the terminal equipment performs at the time of communication by using the setup format described above with reference to FIGS. 2A and 2B. As shown. a transmitting terminal sends a call setup message SETUP to an ISDN (basic rate interface; NT, FIG. 1 ) to request call setup to desired remote terminal equipment. In response, the ISDN sends a SETUP to the designated terminal equipment to call it, while returning an acknowledge message CALL PROC to the transmitting equipment. On detecting the termination of a call, the receiving equipment starts producing an alert tone to alert the operator thereof to the incoming call. At the same time, receiving equipment sends a call message ALERT to the ISDN. In response to the message ALERT, the ISDN sends a response message CONN to the transmitting equipment to inform it of the fact that the receiving equipment has accepted the call. Subsequently, the ISDN sends a response message CONN ACK to the receiving equipment. After a response from the receiving terminal has been confirmed, a line, i.e., B channels are set up between the transmitting equipment and the receiving equipment.

After the data transfer over the B channels, the line is disconnected. Specifically, as the operator at the transmitting equipment on-hooks, the equipment sends a disconnection message DISC to the ISDN to request it to release the data channels. In response, the ISDN sends a message DISC to the receiving equipment to notify it of the recovery of the data channels. On receiving this message DISC, the receiving equipment returns a release message REL to the ISDN. Then, the ISDN sends a message REL to the transmitting equipment to notify it of the release of the B channels or data channels. Finally, the ISDN sends a release complete message REL COMP to the receiving equipment and disconnects the B channels.

In the above construction, assume that the terminal equipment has received a response indicative of a no idle channel condition from the basic rate interface when it has originated a call, i.e., it has received a message REL or REL COMP, FIG. 3, just after the transmission of a message SETUP, FIG. 3. Then, in the illustrative embodiment, the equipment determines whether or not channels occupied by another terminal equipment are released, by using the B channel transmission controllers 20 and 21 as idle channel detecting means. Specifically, to detect the release of the channels, the apparatus detects a disconnect message DIS or a release message REL to be sent from the ISDN to another terminal equipment. When idle channels are detected, the B channel transmission controllers 20 and 21 turns out reoriginating means and again sends a message SETUP to the ISDN.

Figure 4:
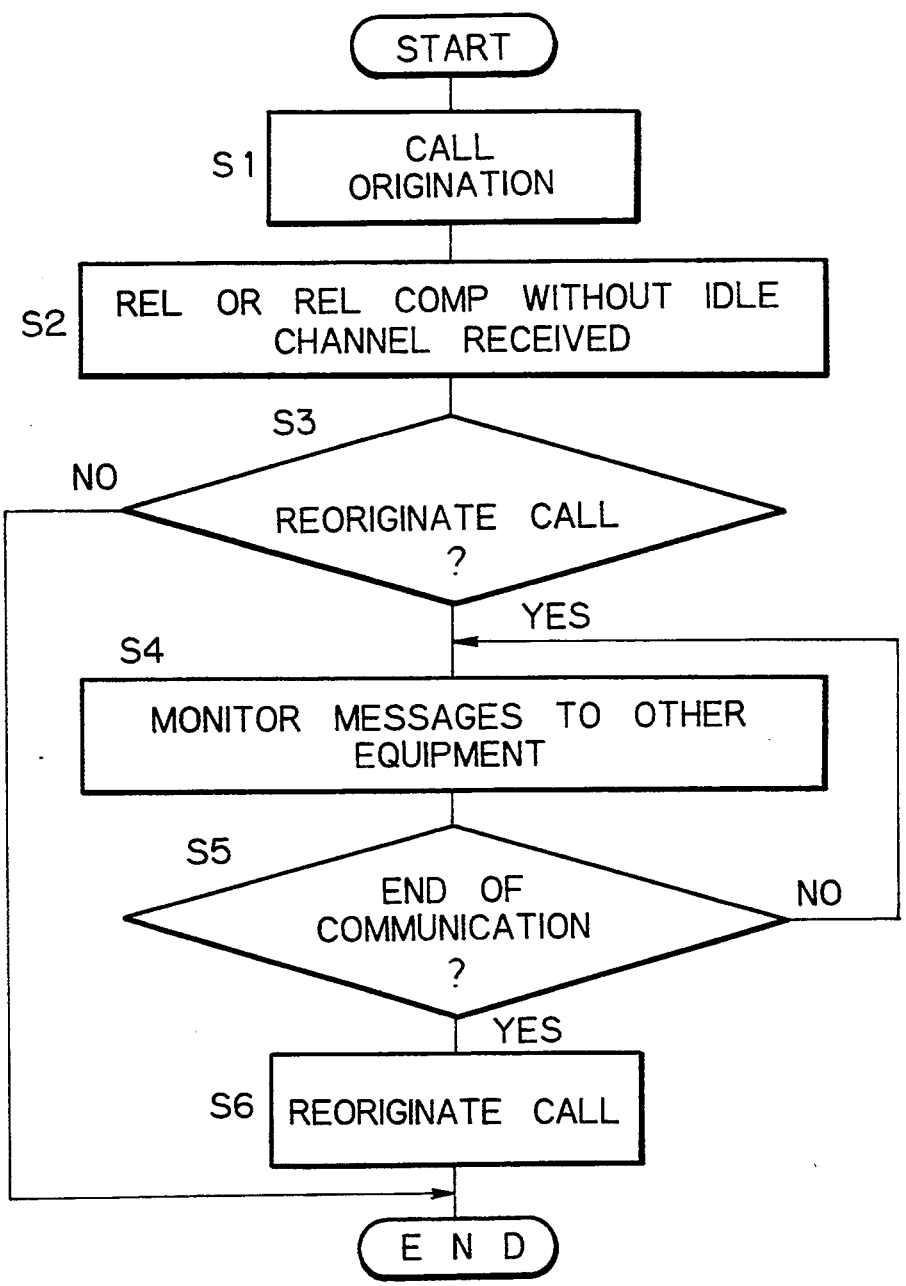
FIG. 4 is a flowchart demonstrating a call reorigination procedure for practicing the present invention.

The operation of the ISDN facsimile apparatus having the above construction will be described with reference to FIG. 4. As shown, the D channel transmission controller 22 of the apparatus sends a call setup message SETUP to the ISDN (STEP S1). Assume that the calling station has received a no idle channel message REL or REL COMP in the network accommodated in the basic rate interface or net terminating device NT just after the transmission of the message SETUP (step S2). Then, the apparatus determines whether or not to reoriginate a call (step S3). Whether or not to reoriginate a call can be set by the user beforehand. If a call does not have to be reoriginated (NO, step S3), the program ends. If a call has to be reoriginated (YES, step S3), the apparatus, i.e., the idle channel detecting means constituted by the B channel transmission controllers 20 and 21 monitors messages to the other terminal equipment connected to the same bus at multiple points (step S4). Whether or not a message meant for another terminal equipment is determined each time on the basis of a TEI (Transmitting Subscriber Identification). If the message of interest DISC or REL representative of the end of communication (step S5), the B channel transmission controllers 20 and 21, which are the reoriginating means this time, send a message SETUP immediately to the ISDN for reoriginating a call (step S6).

As stated above, when the apparatus has received a no idle channel message REL or REL COMP from the basic ISDN interface NT at the time of call origination, the apparatus monitors messages to the other terminal equipment connected to the same bus a multipoint configuration. On receiving a disconnect message DISC or a release message REL, the apparatus starts on a reoriginating operation immediately. The apparatus, therefore, can reoriginate a call as soon as it obtains idle channels. This eliminates the wasteful waiting time ascribable to a timer which neglects actual communication, thereby realizing efficient communication.

An alternative embodiment of the present invention will be described hereinafter. Regarding the construction, in FIG. 1, while both of the two B channels are occupied by the apparatus, the B channel transmission controllers 20 and 21 turn out no channel detecting means and search for a no idle channel signal sent from the net terminating device NT to another terminal equipment. The no idle channel signal is assumed to be REL or REL COMP. On detecting the no idle channel signal, the B channel controllers 20 and 21 turn out channel releasing means and release one of the two B channels occupied by the equipment. Subsequently, the controllers 20 and 21 play the role of monitoring means for determining whether or not another terminal equipment holds a communication. When another terminal equipment has started on a communication, the controllers 20 and 21 turn out communication end detecting means and detect the end of the communication. When the communication ends, the controllers 20 and 21 serve as channel recovering means and set up a call on the released one of the two B channels. As a result:, the communication using the two B channels is restored.

Figure 5:
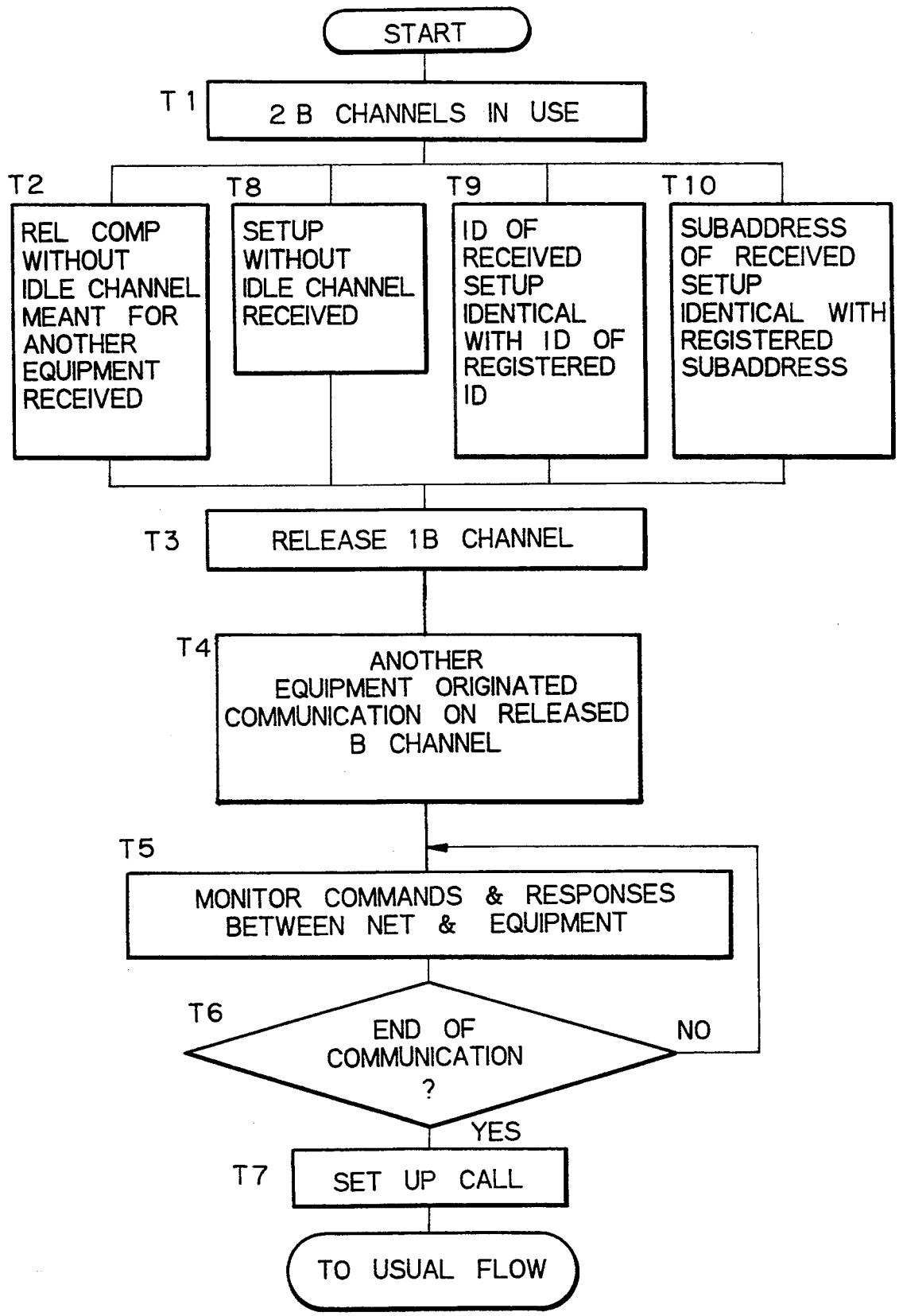
FIG. 5 is a flowchart representative of a procedure for practicing the present invention.

The operation of the alternative embodiment will be described with reference to FIG. 5. As shown, assume that the terminal equipment having the B channel transmission controllers 20 and 21 occupies both of the two B channels (step T1 ). When the apparatus a no channel message REL or REL COMP meant for another terminal equipment connected to the same bus (step T2), the controller 11 of the equipment delivers a B channel release request to the B channel controller 20 or 21. In response, the B channel controller 20 or 21 releases the associated B channel (step T3). In this manner, the equipment occupying two B channels releases one of them to allow another terminal equipment connected to the same bus to originate a call, thereby realizing more efficient communication. On the other hand, assume that another terminal equipment sharing the same bus originates a communication after one of the B channels has been released (step T4). Then, the B channel controllers 20 and 21 monitor messages being interchanged between the equipment originated the communication and the network (step T5). On receiving a message DISC or REL indicative of the end of communication (step T6), the B channel controllers 20 and 21 again set up a call on the released B channel. As a result, the two B channels are restored to the occupied state. Thus, the equipment can use the two B channels again as soon as the communication of another equipment ends.

Another alternative embodiment of the present invention is as follows. In FIG. 1, while the two B channels of the apparatus are used, the B channel controllers 20 and 21 play the role of no channel SETUP detecting means and detects a SETUP terminated at the equipment from another terminal. Specifically, in FIG. 3, assume that when the equipment is using the two B channels, another terminal equipment sends a SETUP meant for the equipment to the ISDN. In response, the ISDN sends a SETUP containing "no idle channel" data to the receiving equipment. On detecting the no channel SETUP, the B channel controllers 20 and 21 turn out channel releasing means and release one of the two B channels.

The operation of this alternative embodiment will be described with reference to FIG. 5. When the equipment using both of the two B channels (step T1 ) receives a SETUP indicative of a no idle channel condition (step T8), the controller delivers a B channel release request to the B channel controller 20 or 21. In response, the B channel controller 20 or 21 releases the associated B channel (step T3). This is followed by the previously stated steps T4–T7.

As stated above, when a SETUP indicative of a no idle channel condition is received, this embodiment releases one of the two B channels. Hence, even when the equipment is using both of the two B channels, it can respond to a call terminated thereat. This is successful in promoting efficient communication.

Another alternative embodiment of the present invention is as follows. In FIG. 1, the system memory 12 or the parameter memory 13 is provided with transmission identification (ID) registering means at which a transmission ID is registered beforehand. While the two B channels are used, the B channel controllers 20 and 21 serve as coincidence detecting means and determine whether or not the transmission ID of a SET UP received from another terminal equipment is coincident with the registered transmission ID. Only when the two transmission IDs are coincident, the B channel controllers 20 and 21 cause the channel releasing means to operate.

The operation of this embodiment will be described with reference to FIG. 5. Assume that the equipment using both of the two B channels (step T1) has received a SETUP indicative of a no idle channel condition. Then, if the transmission ID contained in the message SETUP is identical with the registered transmission ID (step T9), the controller 11 delivers a B channel release request. On receiving this request, the B channel controller 20 or 21 releases the associated B channel (step T3). This is followed by the previously stated steps T4-T7.

As stated above, when using the two B channels, this embodiment releases one of the B channels on confirming the transmission ID. The embodiment, therefore, can return a response only when the communication is originated by a particular or important party.

A further alternative embodiment of the present invention is as follows. In FIG. 1, the system memory 12 or the parameter memory 13 is provided with subaddress registering means at which a particular subaddress is registered beforehand. While the two B channels are used, the B channel controllers 20 and 21 serve as coincidence detecting means and determine whether or not the subaddress included in a SETUP terminated from another terminal equipment is coincident with the registered subaddress. If the two subaddresses are identical, the B channel controllers 20 and 21 cause the channel releasing means to operate.

The operation of this embodiment will be described with reference to FIG. 5. Assume that the equipment using both of the two B channels (step T1) has received a SETUP indicative of a no idle channel condition. Then, if the B channel controllers 20 and 21 determine that the subaddress contained in the message SETUP is identical with the registered subaddress (step T10) the controller 11 delivers a B channel release request. The B channel controller 20 or 21 received the request releases the associated B channel (step T3). This is followed by the previously stated steps T4-T7.

As stated above, when using the two B channels, the embodiment releases one of the B channels on confirming the subaddress. Therefore, this embodiment can also return a response only when the communication is originated by a particular or important party.

In summary, it will be seen that the present invention provides ISDN terminal equipment having various unprecedented advantages, as follows. Since a call reoriginating procedure can be started on as soon as an idle channel occurs, the wasteful waiting time ascribable to a timer which neglects actual communication eliminated to is promote efficient communication. Another terminal equipment sharing the same bus can originate a call, enhancing efficient communication. As soon as another terminal equipment sharing the same bus ends a communication, two B channels can be used. A response is returned only when a communication received is originated by a particular party.

Various modifications will become possible for those skilled in the art after receiving the teachings of the present disclosure without departing from the scope thereof.

What is claimed is:

1. ISDN terminals connected in a multipoint configuration to an ISDN basic rate interface having two B channels for user information transfer and a single D channel for signaling and data transfer as channels which a single one of said ISDN terminals can use, said ISDN terminals being capable of holding a communication, each of said ISDN terminals comprising:

no channel detecting means for detecting, when one of said ISDN terminals is using said two B channels, a signal indicative of a no idle channel condition which is sent to another of said ISDN terminals and indicates to said another of said ISDN terminals that both of said B channels are being used; and channel releasing means for releasing by said one of said ISDN terminals, when said no channel detecting means detects said signal, one of said two B channels having been used by said one of said ISDN terminals.

2. ISDN terminals as claimed in claim 1, wherein each of said ISDN terminals further comprises:

monitoring means for determining, after one of said two B channels has been released, whether or not another of said ISDN terminals holds a communication;

communication end detecting means for detecting, when said another ISDN terminal has held a communication, an end of said communication; and channel recovering means for setting up a call on the released one of said two B channels as soon as said communication ends.

3. ISDN terminal equipment connected in a multipoint configuration to an ISDN basic rate interface having two B channels for user information transfer and a single D channel for signaling and data transfer as channels which a single terminal equipment can use, said ISDN terminal equipment being capable of holding a communication, said ISDN terminal equipment comprising:

SETUP detecting means for detecting, when said ISDN terminal equipment is using said two B channels, a message SETUP terminated at said ISDN terminal equipment from said ISDN; and channel releasing means for releasing, when said SETUP detecting means detects said message SETUP, one of said two B channels having been used by said ISDN terminal equipment.

4. ISDN terminal equipment as claimed in claim 3, further comprising:

transmission identification (ID) registering means for registering a particular transmission ID beforehand; and coincidence detecting means for detecting coincidence of said transmission ID registered at said transmission ID registering means and a transmission ID contained in a message SETUP terminated from another terminal equipment;

said channel releasing means operating only when said transmission IDs are identical.

5. ISDN terminal equipment as claimed in claim 3, further comprising:

subaddress registering means for registering a particular subaddress beforehand; and coincidence detecting means for detecting coincidence of said subaddress registered at said subaddress registering means and a transmission ID contained in a message SETUP from said ISDN;

said channel releasing means operating only when said subaddresses are coincident.

* * * * *